Sept. 2, 1969 WOO F. CHOW 3,465,309
ASSOCIATIVE MEMORY DEVICE PROVIDING INFORMATION WHICH IS
"GREATER THAN" OR "LESS THAN" THE STORED INFORMATION
Filed June 30, 1965

INVENTOR
WOO F. CHOW

BY Rene A. Kuypers
ATTORNEY

United States Patent Office 3,465,309
Patented Sept. 2, 1969

3,465,309
ASSOCIATIVE MEMORY DEVICE PROVIDING INFORMATION WHICH IS "GREATER THAN" OR "LESS THAN" THE STORED INFORMATION

Woo F. Chow, Horsham, Pa., assignor to Sperry Rand Corporation, New York, N.Y., a corporation of Delaware Filed June 30, 1965, Ser. No. 468,498
Int. Cl. G11b *5/62*
U.S. Cl. 340—174 12 Claims

ABSTRACT OF THE DISCLOSURE

An associate memory device is disclosed using non-destructive thin film memory elements which is capable of providing not only a "match" and "mismatch" signal, when a search is made for a piece of information, but additionally, the memory arrangement of this invention may provide a certain polarity signal for searched for information which is "greater than" or "less than" the stored information.

This invention relates in general to a memory device and in particular relates to an associate memory device.

In a conventional associative memory it is customary to interrogate the memory for information that matches a certain associative criterion. In such an arrangement, only that information which matches or is equal to the criterion will be read out of the memory.

It is often times desirable in an associative memory to extract more sophisticated information during a search cycle than simply a match or a mis-match condition. Thus, if a mis-match condition is found to exist, the question arises whether the stored number is "greater than" or "less than" the criterion being looked for.

The above may be illustrated by an example. The flight controller of a busy airport might have many aircraft under surveillance by radar. The information relating to these aircraft, such as airspeed, the distance from the airport, the altitude of the aircraft, etc., might be relayed from the radar to a computer utilizing an associative memory. At an instant of time, the air controller may find it useful to know which aircraft are going at a certain required speed and also which aircraft are going "greater than" or "less than" the certain required speed. Having this particular information at hand, the air controller will be able to make a decision as to aircraft priority for landing. Similarly, such information would be useful to the controller for collision avoidance purposes.

It is therefore an object of this invention to provide a new and improved associative memory device.

It is a further object of the instant invention to provide a new and improved associative memory device which provides "match," "mis-match," "greater than" and "less than" information, without resorting to several search operations.

Other objects of this invention will become apparent to those of ordinary skill in the art by reference to the following detailed description of the exemplary embodiments of the apparatus and the appended claims. The various features of the exemplary embodiments according to the invention, may be best understood with reference to the accompanying drawings, wherein:

Figure 1:
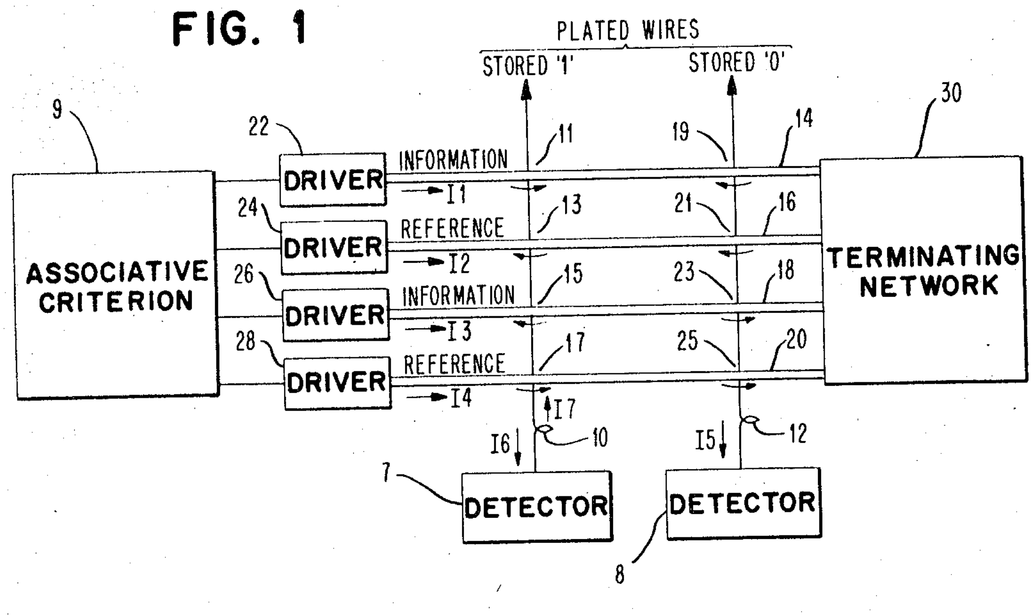
FIGURE 1 illustrates the memory arrangement for a pair of information bits each of which may be either a binary "zero" and a binary "one."

Turning now in particular to FIGURE 1, there is depicted an associative memory arrangement for a pair of information bits in accordance with this invention each of which may be either a binary "one" or binary "zero." The bit arrangement of FIGURE 1 utilizes the vertically arranged plated magnetic wires 10 and 12. The plated wires 10 and 12 are typically five mil diameter, beryllium-copper substrates, upon whose surface is formed a thin, magnetic film. The magnetic film is electroplated on the wire surface with approximately a 10,000 Angstrom thickness of Permalloy (iron-nickel alloy). The Permalloy coating is electroplated in the presence of a circumferential magnetic field that establishes a uniaxial anisotropy axis at right angles (i.e., around the circumference) to the length of the wire. The uniaxial anisotropy establishes an easy and hard direction of magnetization and the magnetization vectors of the thin film are normally oriented in a first or second equilibrium position along the easy axis, thereby establishing two bistable states necessary for binary logic applications. Connected to one end of each of the plated wires 10 and 12 is the respective detector circuit 7 and 8. The other end of each of the plated wires 10 and 12 may be grounded (not shown) in order to provide a complete circuit with the detector 7 and 8.

Figure 2:
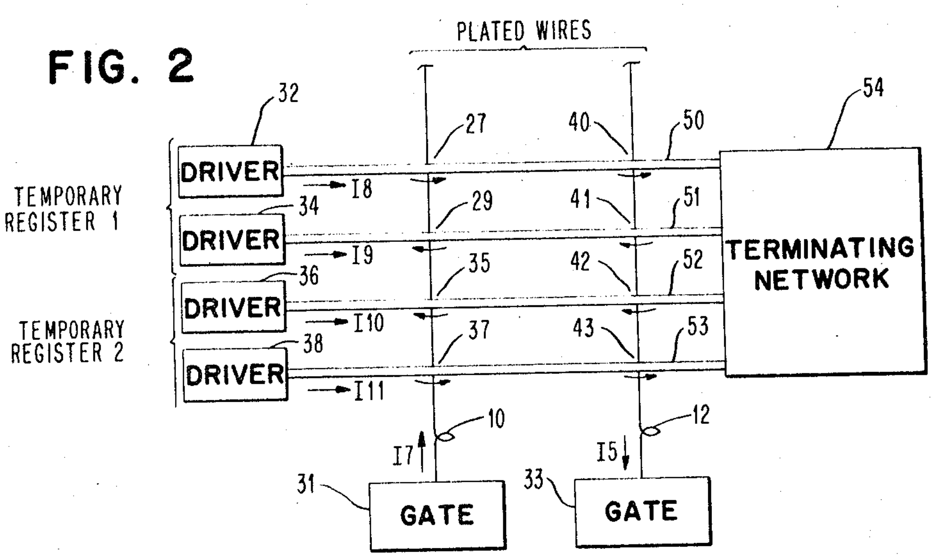
FIGURE 2 depicts the temporary register arrangement utilized in conjunction with the associative memory bit arrangement of FIGURE 1.

Positioned substantially orthogonal and in juxtaposition to the plated wires 10 and 12 are four drive lines or straps 14, 16, 18 and 20. Connected to one end of each of the drive lines 14, 16, 18 and 20 is the respective driver circuits 22, 24, 26 and 28. Connected to the other ends of the drive lines is a terminating network 30 which may be a ground bus. The terminating network 30 provides a complete circuit with the respective driver circuits 22, 24, 26 and 28, which are also grounded. The intersection 11, 13, 15 and 17 as well as 19, 21, 23 and 25, represents a location which may be magnetized in either of two directions. Accordingly, a clockwise or counterclockwise arrow is designated at the various intersections to indicate a certain magnetization. The memory arrangement of FIGURE 1 is such that information is stored along plated wires 10 and 12 at positions 11 and 15 as well as at positions 19 and 23. Reference information is recorded along plated wires 10 and 12 at positions 13, 17, 21 and 25. It should be noted here that the physical arrangement of references shown in FIGURE 2 is for illustration only. In an actual embodiment, the references are usually shared by many information bits. As an example, in order to store a "one" along plated wire 10, intersection 11 is magnetized in a clockwise direction and intersection 15 is magnetized in the counterclockwise direction. Similarly, to store a "zero" along plated wire 12, the intersections 19 and 23 are magnetized respectively, in the counterclockwise and clockwise directions, as viewed from the detectors. Reference signals located at the intersections 13, 17, 21 and 25 are also utilized with the information signals present at intersections 11, 15, 19 and 23. The relationship of the reference and information singals will be discussed in greater detail hereinafter.

The driver circuits 22, 24, 26 and 28 are connected to an associative criterion 9. The associative criterion (binary datum) determines what particular information will be searched and hence what drive circuits will be energized.

The memory of the instant invention can operate in either of two modes. Thus, one mode of operation is to interrogate the memory for a "match" or a "mis-match" condition. The second mode of operation comprises determining during a mis-match whether the stored bit is "greater" or "less" than the bit of the associative criterion. The first mode of operation will be discussed now in greater detail.

To aid in the understanding of the first mode of operation, the following truth table is provided.

TRUTH TABLE I

| | Stored 1 | Stored 0 |
|---|---|---|
| Search for 1 | No output | An output of certain polarity such as −. |
| Search for 0 | An output of same same polarity such as −. | No output. |

The associative criterion 9 will, as mentioned above, determine whether a "one" or a zero" is to be searched and will accordingly energize the proper drive lines. Therefore, if it is required by the associative criterion 9 to search the memory for a "one," the drive straps 14 and 16 will be energized by their respective driver circuits 22 and 24. The currents I1 and I2 will therefore flow in drive straps 14 and 16 and a magnetic field will be generated in each in accordance with Ampere's Law. A magnetizing force will therefore be generated which will cause vectors at the bit locations 11 and 13 as well as the bit locations 19 and 21 to be rotated to some angle less than 90 degrees and toward the hard axis of magnetization. Thus, the vector at location 11 will be rotated to a counterclockwise direction and the vector at location 13 will be rotated to a clockwise direction, viewed perpendicular to FIGURE 2.

Since, the vectors located at the locations 11 and 13, are magnetized oppositely, the induced signals caused by the respective vector rotation in the plated wire 10 will cancel, so that no signal will be sensed by the detector 7. On the other hand, the vectors located at the locations 19 and 21 are magnetized in the same direction and hence the induced voltages in the plated wire 12 will add and therefore produce a negative voltage which will be sensed by the detector 8. This rotation causes a current, I5, to flow in the plated wire 12. The current I5 will flow in the direction shown since it will produce a flux that opposes the reduction of flux which occurs in the counterclockwise direction when the vectors at locations 19 and 21 are rotated by the current I1 and I2. Referring now to the Truth Table I, a search for a "one" will be indicated by no output signal thereby indicating a match at the bit locations 11 and 13 of plated wire 10 whereas a negative output signal in plated wire 12 indicates a mis-match. In other words, the information located at the positions 11 and 13 correspond to the information sought by the associative criterion 9, whereas the bit information located at the locations 19 and 21 does not correspond with the information sought by the associative criterion 9.

Assume now that the associative criterion 9 required that there be a search for a "zero" instead of a "one." Accordingly, the associative criterion 9 causes the drivers 24 and 26 to energize their associated drive lines 16 and 18. The magnetizing force generated by the currents I2 and I3 in the respective drive lines 16 and 18 causes the magnetization vectors at the bit locations 13, 15, 21 and 23 to rotate from the easy toward the hard axis of the magnetization. However, it should be noted that since vectors at locations 13 and 15 are in the same direction and arranged in the same manner as vectors at locations 19 and 21 (previously discussed), a negative signal will be induced in the plated wire 10. This negative signal will cause the current I6 to flow in the plated wire 10. On the other hand, the vectors at the locations 21 and 23 are magnetized oppositely so that the induced voltages in the plated wire 12 caused by the rotation from the easy toward the hard axis of magnetization will substantially cancel each other. Hence no signal will be detected by the detector 8. The results of the search of a "zero" are summarized in Truth Table I.

It is apparent therefore, that if a search has been made, and there is substantially no output signal produced thereby, it will be an indication that the information required by associative criterion and the information stored is identical. On the other hand, if a negative signal is produced by the search, it indicates that there is a mis-match or a difference between the information required by the associative criterion and the information stored.

As will be shown by Truth Table II, the arrangement of FIGURE 1 may be utilized not only to search for a "match" or a "mis-match" condition but also when there is a "mis-match" whether the information required by the criterion is "greater than" or "less than" the stored information.

TRUTH TABLE II

| | Stored 1 | Stored 0 |
|---|---|---|
| Search for 1 | No output | An output of certain polarity such as −. |
| Search for 0 | An output of opposite polarity such as +. | No output. |

Thus, if it is required by the associative criterion 9, to search for a "one" in the bit arrangement of FIGURE 1, it will cause drivers 22 and 24 to energize drive straps 14 and 16, causing the currents I1 and I2 to flow. It is again apparent since the locations 11 and 13 are oppositely magnetized along the easy axis of magnetization that the induced voltages caused by the rotation of the vector 11 in the counter clockwise direction and the vector at position 13 in the clockwise direction will induce opposite polarity signals in the plated wire 10 so that no signal will be sensed by the detector 7. Accordingly, if a "one" is being searched and a "one" is found in the memory, there will be no output signal. This is indicated by referring to Truth Table II. On the other hand, the energizing of the drive straps 14 and 16 by currents I1 and I2 will cause the magnetization vectors at locations 19 and 21 to induce voltages (i.e., by being rotated in the clockwise direction) in the plated wire 12 which will be additive since they are both magnetized in the same direction. The combined voltages induced in the plated wire 12 will be of negative polarity and will cause current I5 to flow. The current I5 flows in the direction shown since it opposes the reduction of flux in the counter clockwise direction in the easy axis of magnetization. This negative signal which is detected by detector 8 indicates that the information stored along plated wire 12 is "less than" the information required by the associative criterion 9. In other words, in searching for a "one" if a negative polarity voltage is detected by the detector 8, it will indicate that the stored information is less than the information required by the associative criterion (i.e., a "zero" is less than a "one"). The above is summarized by line 1 of Truth Table II.

If it is required that a search be made for a "zero," the associative criterion 9 will cause drivers 22 and 28 to energize their respective drive lines 14 and 20 by causing the currents I1 and I4 to flow therein. Since the magnetization vectors at the locations 19 and 25 are magnetized oppositely along the easy axis the induced voltages in the plated wire 12 caused by the vector rotation from the easy toward the hard axis cancel each other so that no signal will be sensed by the detector 8. This indicates in accordance with the Truth Table II that a "match" has been obtained. However, the magnetization vectors are oriented in the same direction with a clockwise orientation along the easy axis at the bit locations 11 and 17. Hence, the magnetic field produced by the currents I1 and I4 in the drive line will cause signals to be induced in the plated wire 10 which will be in additive phase. However, the signal received by the detector 7 will be of positive polarity for the following reason. There is a reduction of flux in the clockwise direction by the rotation of the vectors due to strap currents I1 and I4. Hence the current I7 will flow in the direction that opposes this reduction of flux. This positive polarity signal induced in the plated wire 10 which is sensed by director 7 indicates that the information stored along plate wire 10 is "greater than" the information being searched (i.e., that a "one" is "greater than" a "zero"). The above is summarized in line two of Truth Table II.

While FIGURE 1 has been described with respect to only two bits of information along the plated wires 10 or 12, it should be understood that many such bits can be so arranged to form a memory word along the plated wires 10 and 12 and the reference straps 16 and 20 are usually shared by many information bits. Furthermore, for the "greater" or "less" search involving many bits, the associative criterion 9 would start from the most significant bit and proceed to the least signficant bit. The first positive or negative pulse that would be generated would set one of two temporary registers and a path to that register would be blocked afterwards. This will be discussed in greater detail with respect to FIGURE 2.

FIGURE 2 depicts two temporary registers which may be utilized with "greater" or "less" search cycle discussed above. Hence, FIGURE 2 may be considered as an extension of the plated wires 10 and 12 in FIGURE 1. The elements comprising the temporary registers of FIGURE 2 are composed of essentially the same elements as those of FIGURE 1. Thus, oriented across the plated wires 10 and 12 are additional drive lines 50, 51, 52 and 53. Each drive line 50, 51, 52 and 53 is connected to a respective driver 32, 34, 36 and 38. In order to complete the circuit of each drive line, a termining network 54 is utilized to provide a complete circuit with each of the drivers. Connected to one end of each of the plated wires 10 and 12 is the gating circuit 31 and 33. The gates connected to the plated wires 10 and 12 are designed to present a short circuit or a very small impedance path to the first signal induced in the plated wire and then is set to the open state so that the gate presents a high impedance path to any future pulses on a plated wire. A example of a gating device that would perform such a function is a two-terminal input across which is connected two tunnel diodes in series connection but oppositely poled. The input, one terminal of which is grounded is adapted to receive either a positive or negative signal. A positive signal will drive one tunnel diode frow a low impedance to a high impedance state; similarly, a negative signal will drive the other tunnel diode from a low to a high impedance state. It should be noted that the various bits along one of the word straps of the temporary registers 1 and 2 are magnetized along the easy axis (as shown by the vector orientation) oppositely from the corresponding bits along the second drive line of the same register. The reason for this vector orientation will become more apparent from the following discussion.

The particular orientation of the various bits as just mentioned takes place under the reset state prior to the search process. Thus, the magnetization at the locations 27, 35, 40 and 42 are reset prior to a search, whereas the magnetization at the locations 29, 37, 41 and 43 remain permanently in the opposite direction as shown, since these latter bit locations will be utilized as a reference for the temporary register.

During the interrogation of the memory, both straps 50 and 52 of register 1 and 2 respectively, will be energized by their respective drivers 32 and 36 causing the currents I8 and I10 to flow. When drive lines 50 and 52 are energized the magnetization vectors at the locations 27, 35, 40 and 42 are rotated to an angle less than 90° from the easy axis of magnetization. These vectors are now conditioned to be steered to a new direction by current in the plated wire. Referring again to Truth Table II, assume that a search has been made for a "one." Accordingly, drive lines 14 and 16 of FIGURE 1 are energized by the drivers 22 and 24. No output signal will be induced in the plated wire 10 since a match condition exists (i.e., the bit position 11 and 13 are magnetized in the clockwise and the counterclockwise direction respectively). On the other hand, the energizing of drive straps 14 and 16 produce a negative polarity signal in the plated wire 12 since the vectors are oriented in the same direction (counterclockwise) at the bit position 19 and 21. The negative pulse induced in the plate wire 12 cause the current 15 to flow.

The current I5 is a steering current which switches the vector at location 40 from the clockwise to the counterclockwise direction. The current I5 will have no effect on the magnetization vector at location 42 and hence, the vector will remain in the counterclockwise direction. The current I5 will also flow through the gate 33 after which it will present a high impedance to any future signal in the plated wire 12.

The results of the search for "one" produces the following result. No current is generated in plated wire 10 indicating that a "match" was obtained. This is shown by the fact that vectors at locations 27 and 35 of temporary registers 1 and 2 remain unchanged from their reset condition. However, in searching for a "one" in plated wire 12 a "mis-match" was produced thereby generating the current I5. The current I5 causes the vector aa bit position 40 to be switched so that both vectors at locations 40 and 41 are in the counterclockwise direction. When drive lines 50, 51, 52 and 53 are simultaneously energized by causing the currents I8, 9, 10 and 11 to flow, a negative signal will be produced which will indicate that the information stored is "less than" (i.e., a "zero" is "less than" a "one"). A negative signals is produced since the associative criterion rotation of the vector at location 40 (which is now counterclockwise) and the vector at location 41 cause a reduction of flux in the counterclockwise direction so that the current I5 flow to counteract this flux reduction. It should be noted that the pairs of vector at locations 42 and 43, 27 and 29, and 35 and 37 produces no output since the pair are oppositely magnetized.

It will be recalled that a search for a "zero" in FIGURE 1 required that drive lines 14 and 20 be energized by their respective drivers 22 and 28. It will be further recalled (see Truth Table II) that no output signal was produced in plated wire 12 since the vectors at locations 19 and 25 were oppositely oriented. On the other hand, a positive polarity signal will be induced in the plated wire 10 since the vectors at locations 11 and 17 are oriented in a clockwise direction. This positive polarity signal induced in a plated wire 10 will cause the current I7 to flow therein. The current I7 will generate a magnetizing force which will cause the vector at bit location 35 to be steered into the clockwise direction (i.e., in the same direction as location 37).

The results of the search for a "zero" produces the following. If a match is found in the plated wire 12, the vector orientation of temporary registers 1 and 2 will remain the same. Hence, the output of the temporary registers is zero if all bits are matched since the output of temporary register 1 and 2 will be "zero" (i.e., the vectors are oppositely magnetized). However, the current I7 indicates a mis-match and this current will steer the vector at bit position 35 to a clockwise orientation. Hence, when both straps of temporary register 1 and 2 are simultaneously energized, a positive signal will be generated and this will indicate that the information stored is "greater than" the information sought by the associative criterion (i.e., that a "one" is "greater than" a "zero").

Accordingly, it can be appreciated that a "match" or "mis-match" and if a "mis-match" a "greater than" or "less than" condition can be readily obtained by the associative memory above described without multiple search operations or excessive amount of hardware or logic implementative.

In summary, this invention relates to an associative memory device which is capable of providing not only "match" and "mis-match" information but is also adapted to provide information which will allow a determination to be made whether the information searched is "greater than" or "less than" the information required if there is a "mis-match." The subject invention also provides that the "match" "mis-match," "greater than" or "less than" information can be stored in temporary registers, which can be read out at a later time period.

Obviously, many modifications, of this invention not described herein will become apparent to those already skilled in the art from a reading of this disclosure. Therefore it is intended that the matter contained in the foregoing description and the accompanying drawings be interpreted as illustrated and not limitative, the scope of the invention being defined in the appended claims.

The embodiments of the invention in which an exclusive property or privilege is claimed are defined as follows:

1. A memory arrangement comprising:

(a) at least first, second and third magnetizable data storage elements, each capable of being magnetizable data storage elements, each capable of being magnetized in a first or second state of magnetization, said first and second elements comprising respectively, first and second information elements and said third element comprising respectively, a first reference element, the information recorded in said reference element remaining permanent whereas the information recorded in said information elements is changeable said reference element being magnetized oppositely from said first and second information element;

(b) means, which are adapted to be energized, inductively coupled to said first, second and third elements to produce signals by interrogating in a first mode said first information and said first reference elements, and alternatively, said second information element and said first reference element for a required binary datum;

(c) sense means coupled to said first, second and third storage elements, said sense means detecting substantially no signal in the first mode if said required binary datum is the same as the information stored in said combination of interrogated elements.

2. A memory arrangement comprising:

(a) first, second, third and fourth magnetizable data storage elements each capable of being magnetized in a first or second state of magnetization, said second and fourth elements being permanently magnetized in a first or second direction and said first and third elements adapted to be switched into either said first or second state of magnetization;

(b) means inductively coupled to said first, second, third and fourth elements to produce signals by interrogating in a first mode said first and second and alternatively, said second and third elements for a required binary datum, and to further interrogate in a second mode said first and second and alternatively said first and fourth elements for binary information which is greater than said binary datum or less than said binary datum;

(c) sense means coupled to said first, second, third and fourth storage elements, said sense means detecting substantially no signal in the first mode if said required binary datum is the same as the information stored in said combination of interrogated elements whereas in the second mode said sense means detecting a certain polarity signal which indicates that the information in said combination of magnetizable elements is less than said binary datum and alternatively, an opposite polarity signal indicates that the information in said combination of magnetizable elements is greater than said binary datum.

3. A memory register comprising:

(a) first, second, third and fourth magnetizable data storage elements, said second and fourth elements being permanently magnetized in a first or second direction and said first and third elements adapted to be switched into either said first or second state of magnetization;

(b) means inductively coupled to each said first, second, third and fourth magnetizable data storage elements to generate respective magnetic fields to partially switch the state of magnetization of each said elements;

(c) means further coupled to each said data storage elements to generate either a first or second magnetic field, said first magnetic field causing only said first magnetizable data storage element to be completely switched to said first state of magnetization and said second magnetic field causing only said third magnetizable data storage element to be completely switched to said second state of magnetization.

4. A memory register comprising:

(a) first, second, third and fourth magnetizable data storage elements, said second and fourth elements being permanently magnetized in a first or second direction and said first and third storage elements adapted to be switched into either a first or second state of magnetization;

(b) means inductively coupled to each said first, second, third and fourth magnetizable data storage elements to generate respective magnetic fields to partially switch the state of magnetization of each said elements;

(c) means further coupled to each said data storage elements to produce either a first or second magnetic field; said first magnetic field causing only said first magnetizable data storage elements to be completely switched to said first state of magnetization and said second magnetic field causing only said third magnetizable data storage element to be completely switched to said second state of magnetization;

(d) gating means connected to said first, second, third and fourth data storage elements said first and second magnetic field generating first and second currents which pass through and then open said gate means.

5. The combination comprising:

(a) at least two magnetizable wires;

(b) at least three drive lines which are juxtaposed and positioned orthogonally to said wires, the intersections of one drive line and one wire comprising a memory cell wherein binary information is stored, the intersections of said first wire and said first second and third drive lines comprising first, second and third memory cells, the intersection of said second wire and said first, second and third drive lines comprising fourth, fifth and sixth memory cells, said first memory cell being magnetized in a first direction and said second and third memory cells being magnetized in a second direction for storing a binary one bit of information, said fourth and fifth memory cells being magnetized in a second direction and said sixth memory cell being magnetized in a first direction to store a binary zero;

said second and fifth memory cells being magnetized permanently in the said directions, (c) detector means, said detector means being connected to said first and second wires;

(d) energizing means coupled to said first, second and third drive lines, said first and second drive lines being energized in searching for a binary one and said second and third lines being energized in searching for a binary zero, no signal being induced in said respective wire if the binary information searched for and the binary information stored is the same.

6. The combination in accordance with claim 5 wherein a fourth drive line is positioned in juxtaposition and orthogonally to said first and second wires to form a seventh and eighth memory cell, said seventh and eighth memory cells being magnetized in said first direction, said fourth drive line being connected to an energizing means.

7. The combination in accordance with claim 6 wherein said first and second drive lines are energized in searching for a binary one and said first and fourth drive lines are energized in search of a binary zero, no signal being induced in said wire if the binary information searched for and the binary information stored is the same, a first signal being induced in said wire when the information stored is less than the information searched for, a second signal being induced in said wire when the information stored is greater than the information searched for.

8. The combination in accordance with claim 7 wherein fifth, sixth, seventh and eighth drive lines are juxtaposed and positioned orthogonally to said wires, the intersection of said first wire and said fifth, sixth, seventh and eighth drive lines comprising ninth, tenth, eleventh and twelfth memory cells, the intersection of said second wire and said fifth, sixth, seventh and eighth drive lines comprising thirteenth, fourteenth, fifteenth and sixteenth memory cells, said ninth, twelfth, thirteenth, and sixteenth memory cells being magnetized in a first direction and said tenth, eleventh, fourteenth and fifteenth memory cells being magnetized in said second direction, said tenth, eleventh, fourteenth and fifteenth memory cells being permanently magnetized.

9. The combination in accordance with claim 8 wherein said respective wires are connected to a gating means.

10. The combination in accordance with claim 9 wherein said first induced signal causes said ninth or in the alternative, said thirteenth memory cell to be switched to said second direction after said fifth drive line has been energized.

11. The combination in accordance with claim 9 wherein said second induced signal causes said eleventh or in the alternative, said fifteenth memory cell to be switched to said first direction after said seventh drive line has been energized.

12. The combination in accordance with claim 11 wherein said fifth, sixth, seventh and eighth drive lines are simultaneously energized to determine whether the searched for information is "greater than" or "less than" the stored information.

References Cited

UNITED STATES PATENTS

| | | | |
|---|---|---|---|
| 2,973,508 | 2/1961 | Chadurjian | 340—174 |
| 3,031,650 | 4/1962 | Koerner | 340—174 |
| 3,218,614 | 11/1965 | Kilburn et al. | 340—174 |
| 3,299,409 | 1/1967 | Herman | 340—172.5 |

BERNARD KONICK, Primary Examiner

B. L. HALEY, Assistant Examiner

U.S. Cl. X.R.

340—146.2